United States Patent
Park

(10) Patent No.: US 8,086,088 B2
(45) Date of Patent: Dec. 27, 2011

(54) DIGITAL VIDEO RECORDING METHOD IN AN AUDIO DETECTION MODE

(75) Inventor: Jung-Jae Park, Sungnam-si (KR)

(73) Assignee: Sam Myung Co., Ltd., Incheon Metropolitan City (KR)

( * ) Notice: Subject to any disclaimer, the term of this patent is extended or adjusted under 35 U.S.C. 154(b) by 1589 days.

(21) Appl. No.: 11/069,967

(22) Filed: Mar. 3, 2005

(65) Prior Publication Data
US 2006/0198611 A1    Sep. 7, 2006

(51) Int. Cl.
 H04N 5/77 (2006.01)
 H04N 5/64 (2006.01)
 H04N 7/12 (2006.01)
 H04N 7/14 (2006.01)
 H04N 7/18 (2006.01)
 G08B 1/00 (2006.01)
 G08B 3/00 (2006.01)
 G08B 3/10 (2006.01)

(52) U.S. Cl. .............. 386/224; 340/309.16; 340/328; 340/384.5; 340/691.2; 348/14.04; 348/14.1; 348/143; 348/155; 348/385.1; 348/838; 348/839; 375/240.1; 375/240.12

(58) Field of Classification Search .......... 386/107, 386/E5.01, E5.001; 340/309.16, 328, 384.5, 340/691.2, 907, 909, 937, 436, 438, 506, 340/539.1, 825.36, 825.49, 825.72, 903, 340/945; 348/143, 155, E7.086, 14.1, 385.1, 348/E7.039, E7.083, 14.02, 14.04, E7.079, 348/838, 839, E7.085, E7.09; 379/202.01; 375/240.01, 240.12; 342/36; 701/117

See application file for complete search history.

(56) References Cited

U.S. PATENT DOCUMENTS

| | | | | |
|---|---|---|---|---|
| 4,004,084 A * | 1/1977 | Brown et al. | ........... | 348/14.1 |
| 5,495,288 A * | 2/1996 | Broady et al. | ........... | 348/155 |
| 6,108,028 A * | 8/2000 | Skarbo et al. | ........... | 348/14.03 |
| 6,246,320 B1 * | 6/2001 | Monroe | ........... | 340/506 |
| 6,630,884 B1 * | 10/2003 | Shanmugham | ........... | 340/436 |
| 6,970,183 B1 * | 11/2005 | Monroe | ........... | 348/143 |
| 7,015,954 B1 * | 3/2006 | Foote et al. | ........... | 348/218.1 |
| 7,173,534 B1 * | 2/2007 | Markham et al. | ........... | 340/573.2 |
| 7,348,895 B2 * | 3/2008 | Lagassey | ........... | 340/907 |

(Continued)

FOREIGN PATENT DOCUMENTS

KR    2003024114 A  *  3/2003

*Primary Examiner* — Thai Tran
*Assistant Examiner* — Syed Hasan
(74) *Attorney, Agent, or Firm* — Finnegan, Henderson, Farabow, Garrett & Dunner LLP

(57) ABSTRACT

The present invention is related to a digital video recording method, and in particular, when a recording mode is audio detection, according to an audio signal transmitted from a mike mounted on a camera or a mike mounted separately, this method records the video taken by said camera during the time period for which a recording speed and video resolution is already set as super-high speed and high video resolution. After the elapse of an already set time period, when the audio signal is sensed, this method records the video by varying the recording speed and video resolution from super-high speed and high video resolution into low-speed and low video resolution at a time interval which is already set. Therefore, it becomes possible to obtain the specific information about the video data which is important in an unmanned security system.

3 Claims, 2 Drawing Sheets

U.S. PATENT DOCUMENTS

2004/0258149 A1* 12/2004 Robinson et al. ........ 375/240.01
2005/0031416 A1* 2/2005 Bishop, Jr. ...................... 405/37
2005/0128284 A1* 6/2005 Hoffer et al. ............... 348/14.02
2005/0171907 A1* 8/2005 Lewis ............................. 705/43
2005/0267778 A1* 12/2005 Kazman ............................ 705/1
2005/0280704 A1* 12/2005 Clare et al. .................... 348/143

* cited by examiner

DIGITAL VIDEO RECORDING METHOD IN AN AUDIO DETECTION MODE

TECHNICAL FIELD

The present invention is related to a digital video recording method, and in particular, is related to a digital video recording method in an Audio Detection for changing a video data taken by a camera into a mode set by an user and recording the video data, when an audio signal is captured from a mike mounted on a camera or a mike mounted separately, in an Audio Detection Mode, say, a recording mode.

BACKGROUND ART

Unmanned security system is used mainly as a control method for connecting and operating the automation machines and the machines of a security post installed in a vast number of houses or high-rises. In addition, the system is devised to find the infiltrators who break into a house or a building unexpectedly or find out the outbreak of a fire at an early stage.

This system is also a system which can supervise through a monitor displayed in a remote place by connecting the fire sensors into a computer in the gates or the windows through which it is very easy for the trespassers to break into, or the district in which are vulnerable to a fire or the area in which the fire is easily perceptible.

As an example of the unmanned security system, there is a Time Lapse Video Tape Recorder which is used for monitoring and an observation for a long time to prevent the thefts, and is installed in the important areas such as banks, museums and so on. This recorder does not record all the frames of the video video transmitted from outside imaging apparatus in real-time manner, but records 1 frame at every regular time interval selected from the transmitted video videos in real-time while repeating a progressing and a stop of a recorded tape by a capstan motor of a recording section. In addition, even when reproducing the video signal recorded in a recording tape, this system controls the capstan motor of the recording section and reads an video frame recorded in the recording tape while progressing a tape by an video frame unit. The recording and reproduction of said video frame are performed by an user according to a set input time mode at regular time interval, and thereby the intermittent recording and reproduction of the video signal have been accomplished.

There was a problem that the operator of said apparatus for recording and reproducing a video needs to change the recorded tape periodically, which is very troublesome, and time-consuming, and also needs to purchase an additional equipment for performing special functions such as multi-recording and division of reproduced videos.

In order to solve these problems, a DVR (Digital Video Recorder) which does not use a recording tape of analog system but uses a storage medium of a digital system is developed. This DVR records a video into a storage medium such as a memory in a digital form and reproduces it, and whereby the recorded data can be maintained substantially semi-permanently without damaging the recording medium. Besides, it is a very expensive equipment by which the special functions such as multi-recording and division of reproduced videos can be performed without installing any additional equipments outside.

In such digital video recording apparatus, setting a recording mode and a frame per a second can be performed by an user. Of the recording mode, there are a general continuous mode, a recording mode created by sensing of the movement, and a recording mode created by sensing of a sensor. When setting a recording frame per a second for each mode, generally, four kinds of methods are set as follows. There are a low speed mode in which a recording speed is 5 frame per a second, a middle speed mode in which a recording speed is 9 frame per a second, a high speed mode in which a recording speed is 20 frame per a second, and a super-high speed mode in which a recording speed is 30 frame per a second.

Here, a motion detection mode which is a recording mode of the digital video recording apparatus is the recording mode for adjusting and then detecting the brightness and darkness of a video data captured by a camera in case of the trespass of the infiltrators while the unmanned security system is operating, and movement sensitivity of the brightness and darkness. Since the motion detection mode is a very important function in the unmanned security system which is used as a digital recording apparatus, the recording speed is generally set as the super-high speed mode.

But, in case of above-mentioned motion detection mode, the recording can be performed according to a preceding setting. Therefore, even though a number of frames can be obtained when the preceding setting is the super-high speed mode, there is a problem that the storage capacity of the storage medium is getting larger. When the preceding setting a general mode, it is possible to increase the data amount which can be stored in a storage medium, but there is a problem it is not possible to provide the important videos (for example, the information about an infiltrator) in detail. In addition, there is a problem that the brightness and darkness can not be distinguished due to an obscure video, or a suspect can avoid the motion detection recording mode by taking lower attitudes than sensitivity of the movement of the motion detection mode.

DISCLOSURE OF THE INVENTION

The purpose of the present invention is to solve those conventional technical problems, and in particular to provide an audio detection mode in which the recording can be performed, and which analyzes the audio data when it is impossible to detect in a motion detection mode and, when an audio signal which exceeds the set threshold is detected.

Therefore, a digital video recording method including audio detection mode, and motion detection mode, in which that if the detection is not realized in the motion detection mode, but the audio is detected, it is possible to record a video and audio data with the high video resolution at super-high speed through a number of cameras installed by a manager, and to record the video data at super-low speed gradually after the set time period, is provided.

In order to accomplish above-mentioned objects, a digital video recording method in an audio detection mode, for recording and judging whether an audio is detected or not, or analyzing the video taken by the camera, and an audio data inputted from a mike, and then sensing a motion of the video, wherein an operation signal is generated by a camera when sensing a motion by a sensor of the camera, which includes a step for judging whether a motion is generated or not after a digital video processor analyzes a video inputted from said camera, a step for judging an audio signal exceeds the predetermined value or not after a digital signal processor analyzes an audio signal inputted from a mike, a step for recording on said storage medium a video data taken by said camera during a time period which is already set, according to a motion detection mode and an audio detection mode in which an user sets a recording speed and video resolution, when said audio signal is generated, a step for judging whether an operation signal is generated from a sensor of said camera after the elapse of said time period, a step for stopping the recording of the video taken by said camera, and the audio data inputted from the mike, or recording varied recording speed and video resolution on said storage medium by varying said recording speed and video resolution from super-high speed and high recording video resolution into low-speed and low video resolution at predetermined time interval which is already set, based upon said judging result, is provided.

EMBODIMENT OF THE INVENTION

A plurality of the embodiments of the present invention can exist, and a preferred embodiment will be explained in detail below, with referring to the attached drawings. The skilled person in this art can understand the purpose, the characteristics, and the advantages of the present invention through this embodiment.

Figure 1:
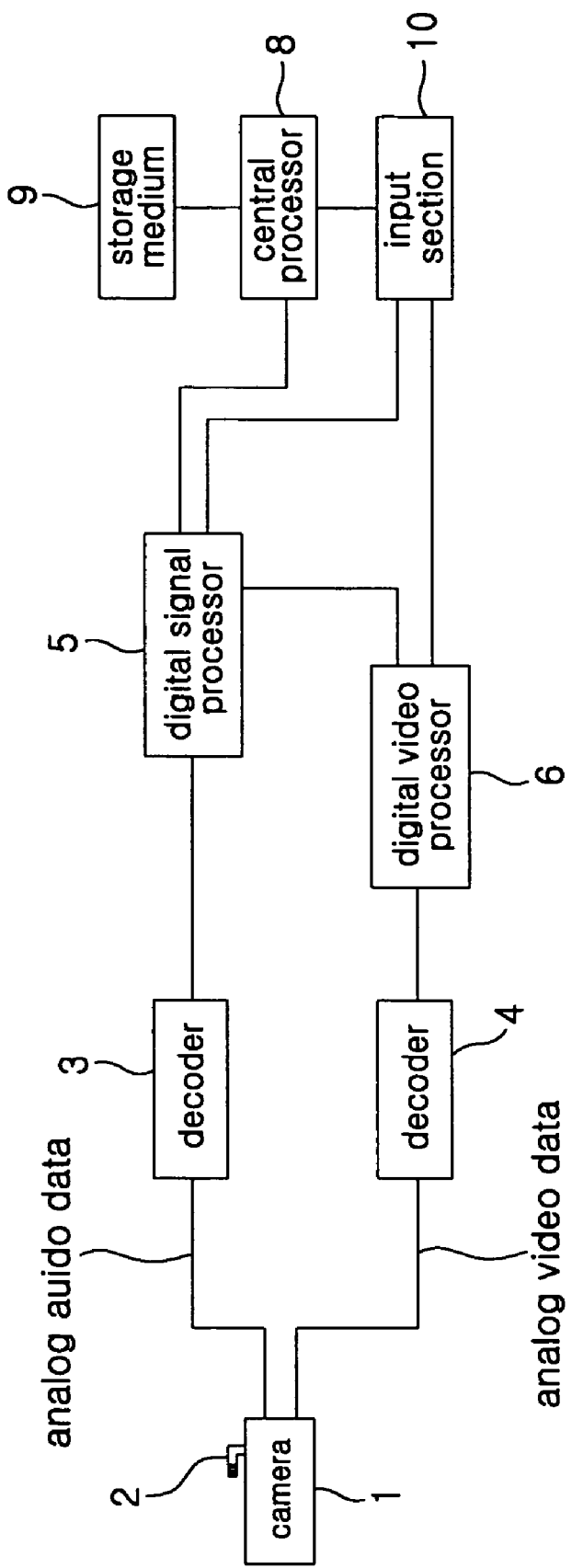
FIG. 1 is a block diagram which shows a digital video recording apparatus applied to the present invention.
Figure 2:
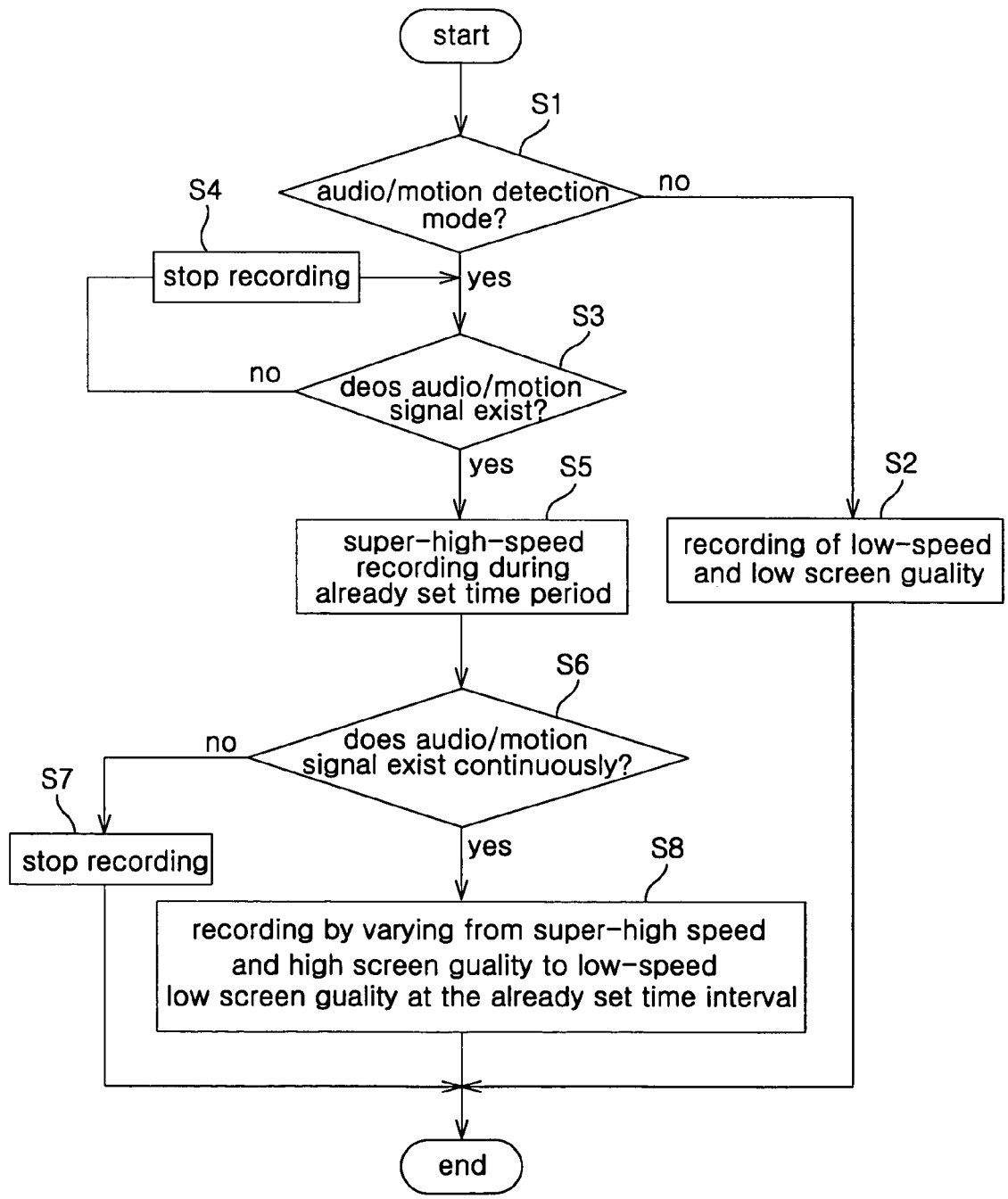
FIG. 2 is a flow chart which shows the processes for recording a digital video data in motion detection mode and audio detection mode.

FIG. 1 is a block diagram which shows a digital video recording apparatus applied to the present invention. FIG. 2 is a flow chart which shows the processes for recording a digital video data in motion detection mode and audio detection mode.

As is shown in FIG. 1, a digital video recording apparatus is composed of a video decoder (A/D converter) (4) for converting an analog video data taken and inputted by a camera (1) into a digital signal, an audio decoder (A/D converter) (3) for converting an analog audio data inputted from a mike into a digital signal, a digital video processor (6) for sensing a motion detection in a video which is converted into the digital signal, a digital signal processor, codec (5) which senses the audio detection by analyzing a digital signal of an audio included in the digital signal transmitted from the video processor and each audio decoder (3, 4), and compresses and outputs the total amount of data by compressing and encoding a video and an audio according to a predetermined compression method, a recording medium (9) for recording the compressed video and audio data sequentially, a host CPU (8) for controlling the procedures for recording the video data of the recording medium (9), an input section (10) for providing an input signal to the host CPU (8) according to settings of a recording mode (general mode, motion detection mode, audio detection mode and sensor mode).

The camera (1) receives a video, and a mike receives an audio. In the digital video processor, a sensor generates an operation signal according the sensing of a motion when the recording mode is a motion detection mode and sends it to the host CPU (8). In case of the audio signal, the digital signal processor for video compression codec senses it and transmits it to the host CPU.

The host CPU (8) starts to record in response the operation signal transmitted based upon a motion detection sensed by the digital video processor, and an audio detection sensed by the digital signal processor. At this time, by varying the recording speed and the video resolution according to the time, the host CPU (8) receives the video data taken by the camera (1) through the video decoder (4) and the video compression codec (the digital signal processor), and records it on the recording medium.

That is, the host CPU (8) starts to record by adjusting the recording speed to the recording mode during the time period set by the operation signal transmitted from the sensor, and then judges whether the operation signal transmitted from the sensor exists or not. As a result of judging, if the operation signal is existing, the host CPU (8) records the video and audio data on the recording medium (9) by varying the recording speed and the recording resolution into the time interval which is already set.

The recording speed changed by the host CPU (8) is changed into the audio detection mode and the motion detection mode in general recording mode.

The operation flows of the digital video recording apparatus having above-mentioned structure is explained as below with referring to FIG. 2.

Before explaining the operations of the digital video recording apparatus, it is assumed that the digital video recording apparatus performs the recording in a general mode which is set as the frames the recording speed of which is low before a recording mode and an audio detection mode are set as a motion detection mode.

The host CPU (8) judges whether a signal is transmitted from the digital video processor which senses the motion detection or from the digital signal processor which senses the audio detection during the recording in general mode (S1).

As a result of judging the signal inputted from the host CPU (8), if the signal is not an audio detection set signal, or a motion detection mode set signal, after the predetermined time elapses, the video data taken by the camera (1) transmitted through the decoder (4) and the codec in a general mode (a low speed and low quality) is received and recorded (S2).

As a result of judging a signal inputted from the input section (10) to which a detection signal is entering, if the signal is a motion detection mode or an audio detection mode set signal, the host CPU (8) judges whether the operation signal representing the motion sensed by the video digital processor, and an audio sensed by the digital signal processor is inputted or not. In addition, as a result of judging, the host CPU (8) records the taken video data on the storage medium for a predetermined time, based upon the set value of the camera (1) for the recording, according a motion or an audio. If there is not an audio or motion detection mode until the elapse of the predetermined time, the host CPU (8) returns to the general mode, and continuously judges whether the operation signal is generated or not (S3, S4).

That is, after the host CPU (8) varies the recording speed and the video resolution at a regular interval when the operation signal is inputted from the sensor continuously and then, records continuously, the host CPU (8) changes the recording speed and the video resolution into a general mode, which is an existing setting mode, step by step.

POSSIBILITY OF THE INDUSTRIAL APPLICATION

As explained above, if the recording mode is an audio detection mode, when an audio signal is inputted from the mike of the camera equipped with a sensor, the digital signal processor analyzes the inputted signal, generates an event, and sends a signal to the host CPU. After designating the recording speed and the video resolution as super-high speed and high recording resolution, during the time period which is already set, the host CPU records the video data taken by the camera on the storage medium, and even after the elapse of the time period, if the operation signal is not sensed, by varying the recording speed and the recording video resolution from super-high speed and high resolution into the recording mode set as a general mode, and recording them on the recording medium, the problems that the discrimination of the brightness and the darkness because of the dark video can not be distinguished, and a suspect tries to avoid the motion detection mode by the lower attitudes than movement sensitivity of the motion detection mode can be prevented. Therefore, it becomes possible to obtain the specific information about the video data which is important in an unmanned security system, and it is also possible to manage the recording capacity of the storage medium efficiently, and to improve the security level by supplementing the parts which can not detected by the motion detection.

The invention claimed is:

1. A method for recording digital video, comprising:
    detecting an audio signal by an audio detector of a camera and detecting a motion by a video detector of the camera;
    recording audio data and video data under an audio detection mode for a first time period in response to the audio signal detected by the camera;
    determining whether the audio signal exists after the first time period;
    stopping the recording of the audio data and the video data, if the audio signal does not exist after the first time period; and
    recording the audio data and the video data under a general mode, if the audio signal exists after the first time period,
    wherein:
        recording the audio data and the video data under the general mode comprises recording the video data at a first speed with a first screen quality; and
        recording audio data and the video data under the audio detection mode comprises recording the video data at a second speed with a second screen quality, the first speed being lower than the second speed and the first screen quality being lower than the second screen quality.

2. The method of claim 1, wherein detecting the audio signal comprises determining whether the audio signal detected by the audio detector exceeds a threshold value.

3. The method of claim 1, further comprising:
    recording the audio data the the video data under a motion detection mode in response to the motion detected by the camera,
    wherein recording the audio data and the video data under the motion detection mode comprises recording the video data at the second speed with the second screen quality.

* * * * *